Feb. 15, 1927.
N. FRANZEN
1,617,800
PRODUCTION OF SHEET GLASS
Filed May 15, 1925
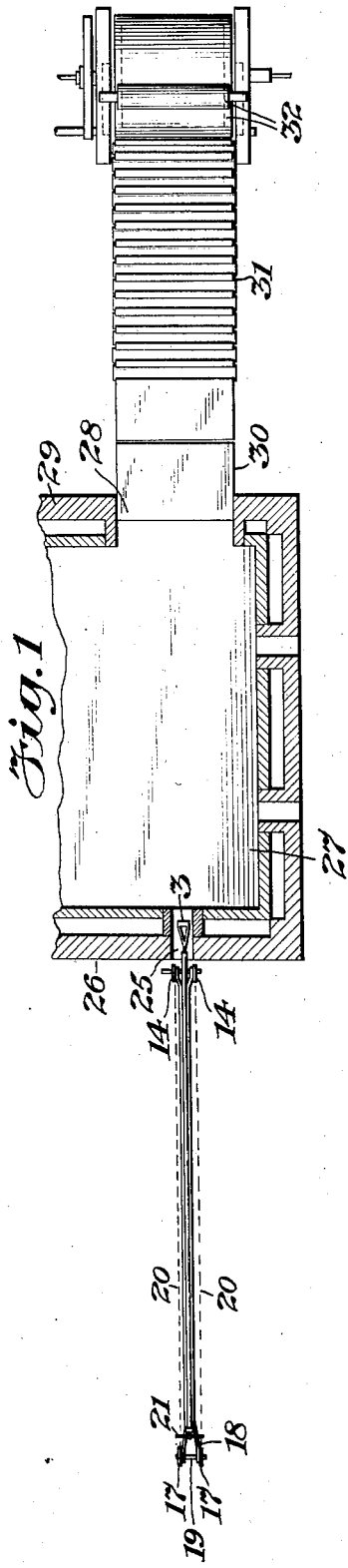
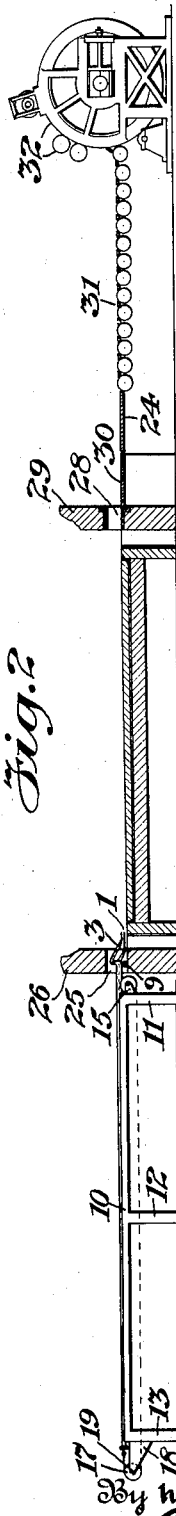
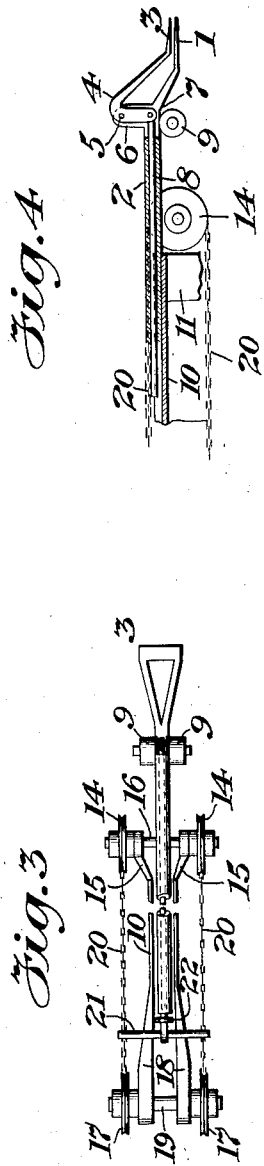
Inventor
Nicklas Franzen
By his Attorneys
Cooper Kerr & Dunham Patented Feb. 15, 1927.

1,617,800

UNITED STATES PATENT OFFICE.

NICKLAS FRANZEN, OF LONG BEACH, CALIFORNIA.

PRODUCTION OF SHEET GLASS.

Application filed May 15, 1925. Serial No. 30,524.

My present invention relates to means for drawing and moving hot sheet glass immediately after it has passed from the forming means into the lehr for the proper heat treatment thereof during its cooling and particularly it relates to glass sheet moving means which automatically grasps a sheet of glass and after moving it the desired distance automatically releases it, although the device of my invention is applicable in the arts generally.

In the manufacture and treatment of sheet glass the sheets are slid into a lehr or other heat treating device and for this sliding of the sheet various means and methods are used involving complicated and cumbersome apparatus which occupy considerable space and involve a considerable outlay in proportion to the work done by them.

In the device of my invention I provide a pair of tongs for grasping the glass sheets automatically on the beginning of movement of said tongs toward the lehr, clinging to said sheet during such movement, and automatically releasing the sheets upon reaching the desired position in the lehr.

In the accompanying drawings which form part of this application:

Fig. 1 is a plan view of the device of my invention in operable relation to a glass lehr and glass sheet forming rolls, said lehr being shown in part horizontal section.

Fig. 2 is an elevation view of the apparatus shown in Fig. 1.

Fig. 3 is a plan view of the tongs of my invention and actuating means therefor, the view being shortened by leaving out a part of the intermediate extensions thereof, and Fig. 4 is an elevation view of the jaws of said tongs and of part of the actuating means.

In the drawing the lower jaw 1 formed on the forward end of pipe 2 cooperates with the upper jaw 3 connected to the bell crank 4 pivoted at 5 between the lugs 6, 6 on said pipe 2 (see Fig. 4). The other end of said bell crank 4 is pivoted at 7 to the end of rod 8 slidable in said pipe 2. At the bottom of said pipe 2 and under the bell crank 4 are mounted the supporting rollers or wheels 9, 9 which extend slightly lower than said lower jaw 1. The way 10 supported by the standards 11, 12 and 13 in turn supports said pipe 2 which slides longitudinally therein. At the forward end of standard 11 are supported the pulleys 14, 14 by the brackets 15, 15 and the spindle 16. At the rear of standard 13 are supported the pulleys 17, 17 by the brackets 18, 18 and the spindles 19. The pair of endless chains 20, 20 pass over said pulleys 14, 14 and 17, 17 and connect with said rod 8 at its rear end by means of the bar 21. The shoulder or collar 22 attached to rod 8 between bar 21 and the end of said pipe 2, serves to limit the movement of said rod 8 in said pipe 2, which movement is sufficient for the opening and closing of said jaws 1 and 3, the closing movement being limited by the jaws themselves coming in contact with each other. Suitable means not shown is provided for moving said chains 20, 20 over said pulleys 14, 14 and 17, 17 in either direction as desired.

As shown in Figs. 1 and 2 the tongs 1, 3, are in their rearmost position, being positioned in the opening 25 of the wall 26 of the lehr 27 and directly opposite the openings 28 in wall 29 of said lehr. Outside said opening 28 is the apron 30 for receiving glass sheets from the conveyor 31 at the other end of which are situated the sheet forming rolls 32. The apron 30 is at a lower level than conveyor 31 and at the same level as apron 24 therebetween.

In the operation of the apparatus of my invention a glass sheet formed between the rolls 32 is carried by the conveyor 31 to the apron 30. The chains 20, 20 having been set into motion by suitable means not shown to move said tongs 1, 3 toward opening 28 the bar 21 moves said rod 8 forwardly in said pipe 2 until said collar 22 comes into contact by the end of said pipe 2, the motion allowed being sufficient for the separation of jaw 3 from jaw 1 through the pivotal movement of bell crank 4. Continuation of the movement of said chains carries pipe 2 on ways 10 to bring the jaws 1, 3 to aprons 30 and 24 over which the end of a sheet of glass on conveyor 31 projects. At this stage the movement of the chains is stopped by suitable manually or automatically controlled means, with the jaw 1 below and the jaw 3 above the end of said sheet. To move the sheet into the lehr 27 said chains 20, 20 are caused to move in the opposite direction at the beginning of which motion rod 8 is moved in said pipe 2 until the closure of jaws 1 and 3 caused thereby prevents further such motion and results in the movement of said pipe 2 away from said apron 30 carrying the glass sheet with it. Upon the attainment of said sheet at a desired position in said lehr 27 said chains 20, 20 are stopped and their direction of movement reversed through a sufficient distance to move rod 8 through pipe 2 to open jaws 1 and 3 to release the glass sheet. During the movement of pipe 2 said wheels 9, 9 serve to support the forward end thereof as they roll over the surface of the lehr and the aprons. Suitable means are provided for moving the glass sheet laterally through the lehr before the next sheet is carried thereinto by the repetition of the operations above described.

I claim:—

1. A grasping and conveying apparatus comprising a ways, a pipe slidable in said ways, a tong jaw fixed to said pipe at one end thereof, a second tong jaw pivoted to said pipe at said end through a bell crank and in operable relation with first said jaw to form a tong therewith, a rod extending through said pipe and movable therein and pivoted to second jaw through said bell crank, a collar on said rod at the end opposite said jaws at such a distance from the contiguous end of said pipe as to allow movement of said rod in said pipe to open and close said jaws on an object therebetween, and means connected with the end of said rod for opening and closing said jaws and moving said pipe on said ways.

2. In combination, a lehr having oppositely spaced openings in opposite walls thereof, glass sheet rolling and conveying means at and to one side of one of said openings, and at the other of said openings and aligned with said conveying means a grasping and conveying means comprising a ways, a pipe slidable on said ways, a tong jaw fixed to said pipe at the lehr end thereof, a second tong jaw pivoted to said pipe at said end through a bell crank and in operable relation with first said jaw to form a tong therewith, a rod extending through said pipe and movable therein and pivoted to second said jaw through said bell crank, a collar on said rod at the end opposite said jaws at such a distance from the contiguous end of said pipe as to allow movement of said rod in said pipe to open and close said jaws, chains movable over pulleys stationary with said ways and connected with said rod at the end opposite said jaws and of substantially the same length between said pulleys as the distance between first said conveying means and the inner wall of said lehr nearest said ways.

In testimony whereof I hereto affix my signature.

NICKLAS FRANZEN.